(12) United States Patent
Skingsley

(10) Patent No.: US 10,752,083 B2
(45) Date of Patent: Aug. 25, 2020

(54) SYSTEM AND METHOD FOR CONTROLLING TEMPERATURE IN A REFRIGERATED VEHICLE

(71) Applicant: OCADO INNOVATION LIMITED, Hatfield Herts (GB)

(72) Inventor: Stuart Skingsley, Hatfield Herts (GB)

(73) Assignee: OCADO INNOVATION LIMITED, Hatfield, Herts (GB)

( * ) Notice: Subject to any disclaimer, the term of this patent is extended or adjusted under 35 U.S.C. 154(b) by 100 days.

(21) Appl. No.: 16/076,470

(22) PCT Filed: Feb. 3, 2017

(86) PCT No.: PCT/EP2017/052373
§ 371 (c)(1),
(2) Date: Aug. 8, 2018

(87) PCT Pub. No.: WO2017/137322
PCT Pub. Date: Aug. 17, 2017

(65) Prior Publication Data
US 2019/0047357 A1 Feb. 14, 2019

(30) Foreign Application Priority Data
Feb. 8, 2016 (GB) .................................. 1602231.1

(51) Int. Cl.
*B60H 1/00* (2006.01)
*F02N 11/08* (2006.01)
(Continued)

(52) U.S. Cl.
CPC ..... *B60H 1/00778* (2013.01); *B60H 1/00364* (2013.01); *B60H 1/00771* (2013.01); *B60H 1/00971* (2013.01); *B60H 1/3232* (2013.01); *B60P 3/20* (2013.01); *F02N 11/0803* (2013.01); *F02N 11/0807* (2013.01); *F02N 11/0848* (2013.01); *B60H 2001/3238* (2013.01);
(Continued)

(58) Field of Classification Search
None
See application file for complete search history.

(56) References Cited

U.S. PATENT DOCUMENTS

| 4,345,554 | A | * | 8/1982 | Hildreth | ............. | B60H 1/00642 |
|---|---|---|---|---|---|---|
| | | | | | | 123/179.2 |
| 5,186,015 | A | * | 2/1993 | Roehrich | ............. | B60H 1/3208 |
| | | | | | | 62/133 |

(Continued)

FOREIGN PATENT DOCUMENTS

GB 2264570 A 9/1993

OTHER PUBLICATIONS

International Search Report (PCT/ISA/210) dated May 3, 2017, by the European Patent Office as the International Searching Authority for International Application No. PCT/EP2017/052373.
(Continued)

*Primary Examiner* — Henry T Crenshaw
(74) *Attorney, Agent, or Firm* — Buchanan Ingersoll & Rooney PC

(57) ABSTRACT

A system is disclosed for incorporation into a refrigerated delivery vehicle, the system enabling efficient cooling of the refrigerated compartment of a vehicle to avoid unnecessary idling of the vehicle's engine.

15 Claims, 1 Drawing Sheet

(51) Int. Cl.
  *B60H 1/32* (2006.01)
  *B60P 3/20* (2006.01)
  *G01S 19/42* (2010.01)
(52) U.S. Cl.
  CPC ............ *B60H 2001/3266* (2013.01); *B60H 2001/3273* (2013.01); *F02N 2200/061* (2013.01); *F02N 2200/08* (2013.01); *F02N 2200/0803* (2013.01); *F02N 2200/123* (2013.01); *F02N 2300/304* (2013.01); *F02N 2300/306* (2013.01); *G01S 19/42* (2013.01)

(56) References Cited

U.S. PATENT DOCUMENTS

| | | |
|---|---|---|
| 5,825,283 A | 10/1998 | Camhi |
| 2001/0035817 A1* | 11/2001 | Mizuta ................ B60R 16/0232 340/438 |
| 2007/0288154 A1 | 12/2007 | Letang |
| 2008/0009988 A1* | 1/2008 | Metzger ............. B60H 1/00771 701/36 |
| 2010/0070153 A1* | 3/2010 | Bradley ............ B60W 50/0098 701/103 |
| 2010/0131152 A1* | 5/2010 | Castonguay ....... B60H 1/00778 701/36 |
| 2011/0060480 A1* | 3/2011 | Mottla ................... G06Q 10/02 701/2 |
| 2014/0257679 A1* | 9/2014 | Boesch .................. F02D 17/04 701/112 |
| 2016/0002892 A1* | 1/2016 | Aizawa ................ E02F 9/2292 701/99 |

OTHER PUBLICATIONS

Search Report dated Jun. 14, 2017, by the British Patent Office for Application No. 1701784.9.
Written Opinion (PCT/ISA/237) dated May 3, 2017, by the European Patent Office as the International Searching Authority for International Application No. PCT/EP2017/052373.

\* cited by examiner

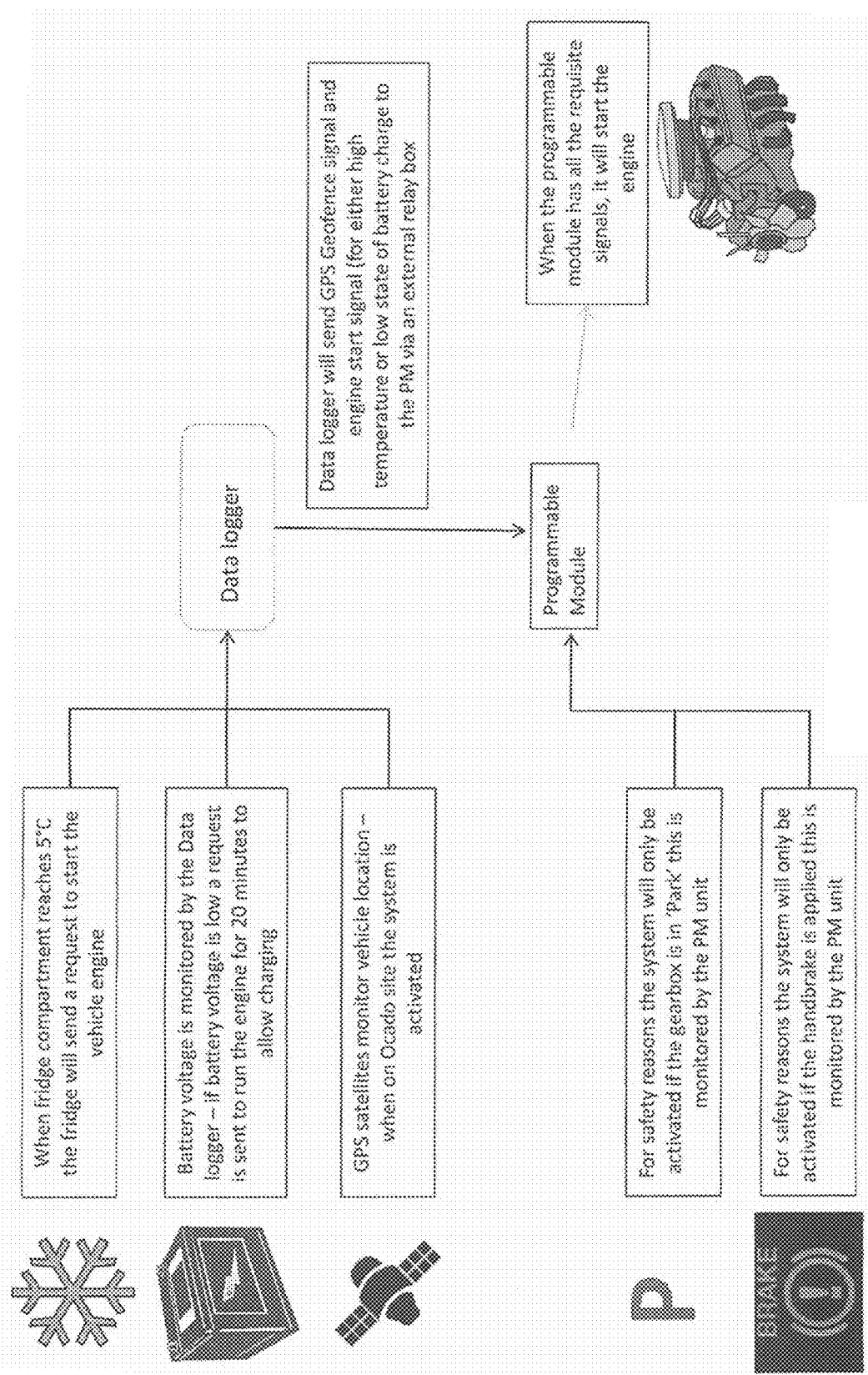

SYSTEM AND METHOD FOR CONTROLLING TEMPERATURE IN A REFRIGERATED VEHICLE

The present invention relates to a refrigerated delivery vehicle which can be efficiently cooled using an automated system which avoids unnecessary idling of the vehicle's engine.

The present invention claims priority from UK Patent Application No. GB1602231.1 filed on 8 Feb. 2016 the content of which is incorporated herein by reference.

Refrigerated vans are conventionally only cooled whilst the engine is running. Once the engine is turned off the compressor of the refrigeration system stops and the temperature in the van moves towards ambient temperature.

Whilst this may not be a significant concern during delivery runs as the duration during which the vehicle's engine is off for example during a delivery drop is fairly limited and the van will rapidly return to its desired temperature once the engine is switched on and refrigeration resumes as the van travels to the next delivery drop location.

However if loaded refrigerated delivery vans are stationary for protracted periods for example at an order picking or distribution site or store orders will deteriorate if not adequately refrigerated.

The refrigeration system of a conventional delivery van can only be activated by switching the engine on and allowing it to idle that is to say the vehicle remains stationary with the engine running, until the van reaches the desired temperature and then switching the engine off. If the engine is not switched off once the desired temperature is reached the engine will run for no benefit.

Constant vigilance is therefore required to switch the engine on and off again to ensure the delivery vehicle maintains the desired temperature and excessive idling of the engine which increases fuel expenditure, pollution and costs is avoided. This may be possible, though undesirable when the vehicle and its driver are held stationary for protracted periods for example in traffic. However a need exists for an automated means of controlling the temperature of refrigerated delivery vehicles which are parked and therefore driverless for extended periods such as at a distribution center, or store to ensure their existing or future contents do not deteriorate.

The present invention relates to a refrigerated delivery vehicle comprising a programmable module which in use receives data or signals regarding:
 i) the vehicle's location,
 ii) the gearbox position,
 iii) the bonnet position,
 iv) the handbrake or park position, and
 v) the temperature of the vehicle
and switches the vehicle's engine on and off when predetermined signals or data or are received.

In a preferred aspect the programmable module receives further data or signals regarding:
 i) the vehicle's battery voltage
and switches the vehicle's engine on for a preset time when predetermined signals or data are received.

In a preferred aspect the preset time is selected from 60 minutes, 45 minutes, 30 minutes, 20 minutes and 10 minutes.

In a preferred aspect the vehicle's location is determined by a GPS receiver.

In a preferred aspect the vehicle must be within a predetermined Geofence to permit the programmable module to switch the vehicle's engine on.

In a preferred aspect the gearbox must be in the park position to permit the programmable module to switch the vehicle's engine on.

In a preferred aspect the bonnet must be closed to permit the PSM to switch the vehicle's engine on.

In a preferred aspect the handbrake must be fully applied to permit the programmable module to switch the vehicle's engine on.

In a preferred aspect the temperature of the fridge compartment must be above 4.99° C. to permit the PSM to switch the vehicle's engine on.

In a preferred aspect the vehicle's hazard lights are activated and/or the horn is sounded by the programmable module prior to switching the vehicle's engine on.

In this way, the present invention overcomes the problems of the prior art and provides an efficient way of maintaining the temperature of the fridge compartment and/or the charge in the vehicle's battery without excessive, wasteful idling of the engine.

The invention will now be described with reference to the accompanying diagrammatic drawing in which:

FIG. 1: is a flow diagram illustrating the elements needed to switch the engine of a stationary refrigerated delivery vehicle on.

Referring to FIG. 1 one or more Global Positioning System (GPS) satellites monitor the location of the vehicle and activate the stop start system only when the vehicle is at a predetermined site such as a distribution centre or store located within a Geofence.

For safety reasons the system will only be activated if the gearbox of the vehicle is in the park position.

For safety reasons the system will only be activated if the handbrake of the vehicle is fully applied.

For safety reasons the system will only be activated if the bonnet is closed.

Preferably the gearbox, bonnet and handbrake are monitored by a Parametric Special Module (PSM) or like unit.

The temperature of the van is continuously monitored by one or more temperature sensors. When the fridge compartment reaches a preset first or upper temperature the fridge sends a request to start the vehicle engine. Preferably the preset first or upper temperature is between 4° C. and 10° C. more preferably the preset first or upper temperature is above 4.99° C.

When the vehicle is within a preset Geofence, the gearbox is in the park position, the handbrake is fully applied, the bonnet is closed and a signal is sent to start the engine in response to the temperature of the fridge compartment the programmable module will start the engine automatically.

When the fridge compartment reaches a preset second or lower temperature the condenser will switch off and send a signal to the programmable module to switch the vehicle engine off. Preferably the preset second or lower temperature is 2° C.

If the temperature of the fridge compartment rises to the preset first or upper temperature again the fridge compartment sends another request to the programmable module to start the vehicle's engine and the process is repeated.

Optionally the battery voltage of the vehicle is continuously monitored. If the voltage of the battery falls below a preset level a request to start the vehicle's engine is sent to the programmable module.

If the vehicle is within a Geofence, the gearbox is in the park position, the handbrake is fully applied, the bonnet is closed and a signal is sent to start the engine the programmable module will start the engine automatically for a predetermined period sufficient to charge the battery. Preferably the predetermined period is selected from 60 minutes, 45 minutes, 30 minutes, 20 minutes, 10 minutes and 5 minutes.

The stop start system will be active when a delivery vehicle is located within a Geofence, the handbrake is applied and/or the gearbox is in the park position, and the bonnet is closed whether the ignition is running or switched off.

When the fridge compartment reaches a preset temperature and the fridge compartment sends a request to the programmable module to start the vehicle's engine if the engine is already running nothing will happen. If the engine is turned off the PM will flash the hazard lights repeatedly. Preferably the hazard lights will be flashed for a period selected from 60 seconds, 30 seconds, 20 seconds, 15 seconds, 10 seconds, 5 seconds and 4 seconds to warn passers by that the engine is about to switch on. The PSM will then start the vehicle's engine which will switch on the compressor and commence cooling of the fridge compartment.

Alternatively or additionally the programmable module may sound the horn of the vehicle to warn passers by that the engine is about to switch on.

If a driver enters the vehicle whilst the engine is running as soon as the gearbox is changed from the park position the stop start system is deactivated and the vehicle can be driven away as normal.

If a driver enters the vehicle whilst the engine is not running they can simply start it from the ignition key in the usual way.

Many variations and modifications not explicitly described above are also possible without departing from the scope of the invention as defined in the appended claims.

The invention claimed is:

1. A system for controlling temperature in a refrigerated delivery vehicle, the system comprising:
   a switch which in use is configured to receive input signals or data regarding:
   i) a vehicle's location,
   ii) a gearbox position,
   iii) a hood position,
   iv) a handbrake position, and
   v) a temperature of a vehicle; and
   a switch output configured for producing a signal to switch a vehicle's engine on and off when a predetermined one or more of the input signals or data are received by the switch;
   wherein hazard lights and/or a horn of the vehicle are activated in response to an output of the switch prior to switching the vehicle's engine on.

2. A system as claimed in claim 1 wherein the switch is configured to receive further data regarding:
   i) a vehicle's battery voltage; and
   the switch output is configured to switch the vehicle's engine on for a preset time when predetermined signals or data are received by the switch.

3. A system as claimed in claim 2, wherein the preset time is selected from 60 minutes, 45 minutes, 30 minutes, 20 minutes and 10 minutes.

4. A system as claimed in claim 1, in combination with a GPS receiver and a vehicle, wherein the vehicle's location is determined by the GPS receiver in the vehicle.

5. A system as claimed in claim 4, wherein the vehicle must be within a predetermined Geofence to permit the switch output to produce a signal to switch the vehicle's engine on.

6. A system as claimed in claim 1, in combination with a vehicle, wherein a gearbox of the vehicle must be in a park position to permit the switch output to produce a signal to switch the vehicle's engine on.

7. A system as claimed in claim 1, in combination with a vehicle, wherein a hood of the vehicle must be closed to permit the switch output to produce a signal to switch the vehicle's engine on.

8. A system as claimed claim 6, wherein a handbrake of the vehicle must be fully applied to permit the switch output to produce a signal to switch the vehicle's engine on.

9. A system as claimed in claim 6, wherein a temperature of a fridge compartment of the vehicle must be above 4.990 C to permit the switch output to produce a signal to switch the vehicle's engine on.

10. A vehicle comprising the system of claim 1.

11. A method of maintaining a temperature in a refrigerated compartment of a vehicle, the method comprising:
    receiving signals or data regarding:
    i) the vehicle's location,
    ii) a gearbox position,
    iii) a hood position,
    iv) a handbrake position, and
    v) a temperature of the vehicle;
    switching an engine of the vehicle on and off in response to signals or data received; and
    activating hazard lights and/or a horn of the vehicle in response to an output of the switch prior to switching the vehicle's engine on.

12. A method as claimed in claim 11, comprising:
    receiving data regarding a battery voltage of the vehicle; and
    switching the vehicle's engine on for a preset time when predetermined signals or data are received.

13. A method as claimed in claim 12, wherein the preset time is selected from 60 minutes, 45 minutes, 30 minutes, 20 minutes and 10 minutes.

14. A method as claimed in claim 11, comprising:
    locating the vehicle's position using a GPS receiver in the vehicle.

15. A method as claimed in claim 11, wherein the vehicle must be within a predetermined Geofence to permit the programmable module to switch the vehicle's engine on.

* * * * *